Jan. 5, 1943.  J. MUELLER  2,307,635

TABULATING MACHINE

Filed March 11, 1940  5 Sheets-Sheet 1

INVENTOR
JOHN MUELLER
BY W. A. Spark
ATTORNEY

Jan. 5, 1943.  J. MUELLER  2,307,635
TABULATING MACHINE
Filed March 11, 1940     5 Sheets-Sheet 2

INVENTOR
JOHN MUELLER
BY W. A. Sparks
ATTORNEY

Jan. 5, 1943.   J. MUELLER   2,307,635
TABULATING MACHINE
Filed March 11, 1940   5 Sheets-Sheet 3

INVENTOR
JOHN MUELLER
BY *W. G. Sparks*
ATTORNEY

Jan. 5, 1943. J. MUELLER 2,307,635
TABULATING MACHINE
Filed March 11, 1940 5 Sheets-Sheet 4

INVENTOR
JOHN MUELLER
BY W. A. Spark
ATTORNEY

Jan. 5, 1943.   J. MUELLER   2,307,635
TABULATING MACHINE
Filed March 11, 1940   5 Sheets-Sheet 5

REPRESENTATIVE INSURANCE COMPANY
NEW YORK N.Y

PREMIUM NOTICE

| NAME AND ADDRESS OF INSURED | | | | | | | COLL. AGENCY | POLICY NUMBER |
|---|---|---|---|---|---|---|---|---|
| HANSEN JOHN P 168 CLINTON ST BROOKLYN N Y | | | | | | | 3364 | 1234567 |

| AGENCY | COLL INS ZONE RATE | DATE OF POL. DAY MO YEAR | PLANCL | NET PREMIUM | INTEREST ON POLICY LOAN | OVERDUE INSTALLMENT | INTEREST ON OVERDUE INSTALLMENT | TOTAL AMOUNT DUE | DIVIDEND | INTEREST ON ACC. DIV. | TOTAL |
|---|---|---|---|---|---|---|---|---|---|---|---|
| 463204 | 23 | 1 23 02 | 11 | 3610 | 210 | 4072 | 400 | 8292 | 210 | | |

FIG. 9

REPRESENTATIVE INSURANCE COMPANY

RETURN STUB

| HANSEN JO | | | | | | |
|---|---|---|---|---|---|---|
| | DATE DUE MO DAY | COLL AGENCY | AMOUNT DUE | DIVIDEND | POLICY NUMBER | |
| AGENCY COLL ZONE | | | | | | |
| 463204 | 23 1 | 3364 | 8292 | 210 | 1234567 | |

FIG. 9A

INVENTOR
JOHN MUELLER
BY *W. A. Spark*
ATTORNEY

Patented Jan. 5, 1943

2,307,635

UNITED STATES PATENT OFFICE 2,307,635

TABULATING MACHINE

John Mueller, North Bergen, N. J., assignor to Remington Rand Inc., Buffalo, N. Y., a corporation of Delaware Application March 11, 1940, Serial No. 323,427

3 Claims. (Cl. 235—61.9)

This invention relates to record controlled tabulating machines and, particularly, to improvements in the construction and manner of operation of blocking devices for preventing printing and/or accumulating in such machines. An embodiment of the invention is shown herein as applied to a tabulating machine of the type disclosed in the application to John Mueller, S. N. 316,739, filed February 1, 1940, or the corresponding British patents to John Mueller, No. 522,562, dated November 13, 1937.

In the preparation of tabulated reports under the control of perforated records, it is frequently desirable, for reasons apparent to those skilled in the art, to prevent the printing and/or accumulation of data contained in one or more columns of a record, or to prevent the printing of a total and the clearing of the accumulator usually incident thereto. In the type of machine disclosed in the cited application these results are attained by moving a blocking device or naught stop in to the path of movement of a combined type carrier and accumulator actuating rack to prevent the positioning of any type on the type carrier and/or the actuation of the associated accumulator wheel by the actuating rack. When this procedure is employed to prevent total printing, the motive power is usually derived from a power driven total shaft whereby an almost unlimited number of naught stops may be actuated in accordance with the requirements of the tabulation desired.

It will be noted that the combined type carrier and accumulator actuating rack is referred to in the above mentioned application as a differential member which is believed to be more concise than the full descriptive term, and is also generic to both uses. Although both functions are applicable, in the present invention the term type carrier or bar will be used to simplify the description.

When data printing, or accumulation, is to be prevented, this condition is usually controlled by a special control perforation in a record. This perforation serves to elevate a translator wire to actuate one or more naught blocks which, in turn, are effective to cause the requisite movement of the associated naught stops to their blocking positions. Whereas, this procedure is feasible when a limited number of naught stops are to be moved, it is not practicable when a number of stops substantially in excess of ten are involved. This limitation is due to the fact that the tension exerted by a large number of springs in the naught stop linkages is sufficient to bend the translator wire slightly if a rigid translator wire is used, or, in the event that Bowden wires are used in the translator, to stretch the Bowden wire casing. Under these conditions it is apparent either that the naught stops will not be moved a sufficient distance to impede the movement of the type carriers and actuating racks, or that continued usage will cause excessive wear of the parts and necessitate costly repairs.

The principal object of the invention is to improve naught stop operating mechanism whereby an unlimited number of naught stops may be readily moved to blocking position under control of a single perforation in a record.

A preferred embodiment of the invention is shown in the drawings, wherein

Figs. 9 and 9A, taken together, represent a tabulated report sheet prepared in accordance with the invention.

Figure 1:
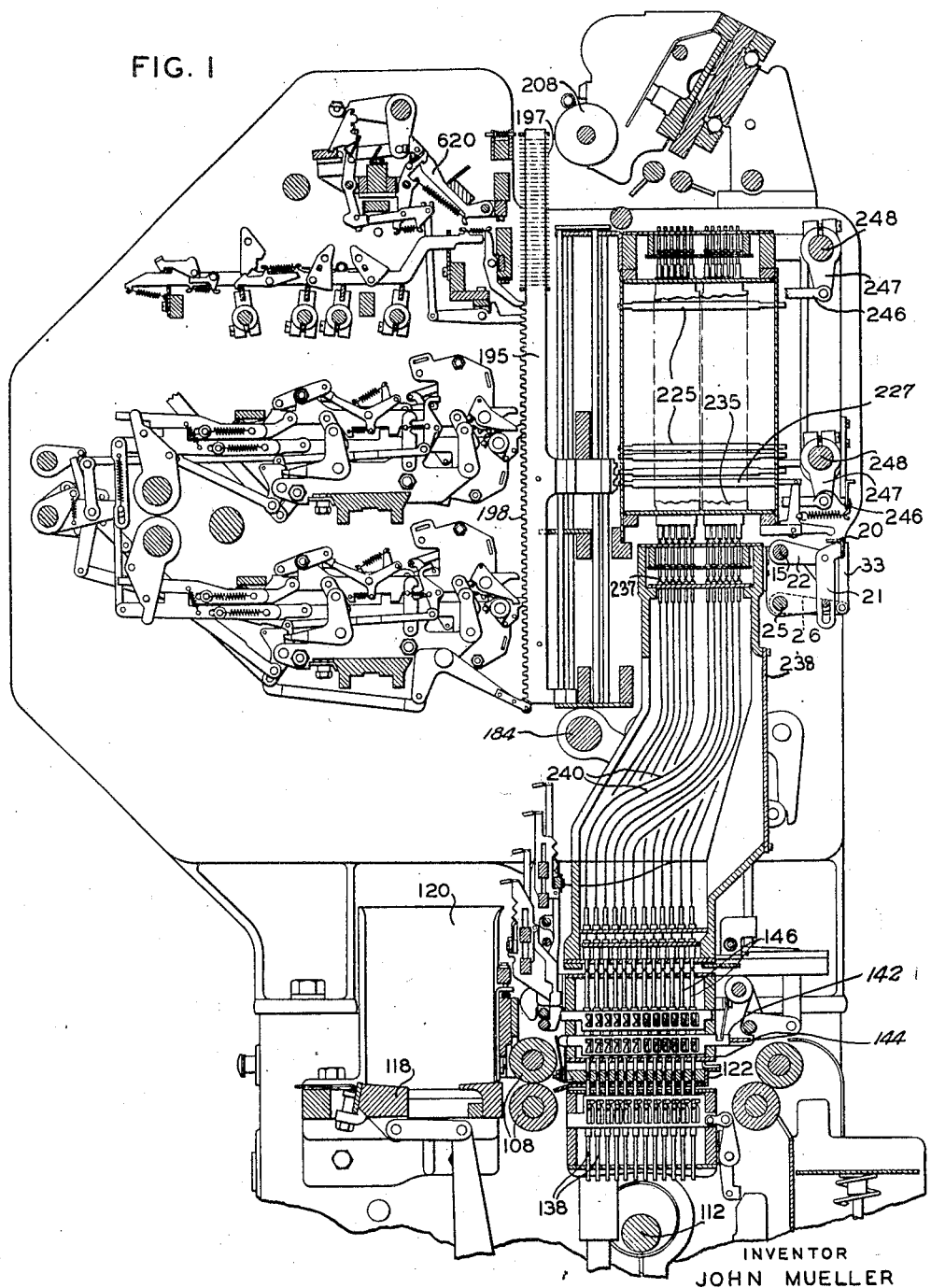
Fig. 1 is a conventional sectional view of the tabulator disclosed in the cited application, including a portion of the new mechanism.
Figure 2:
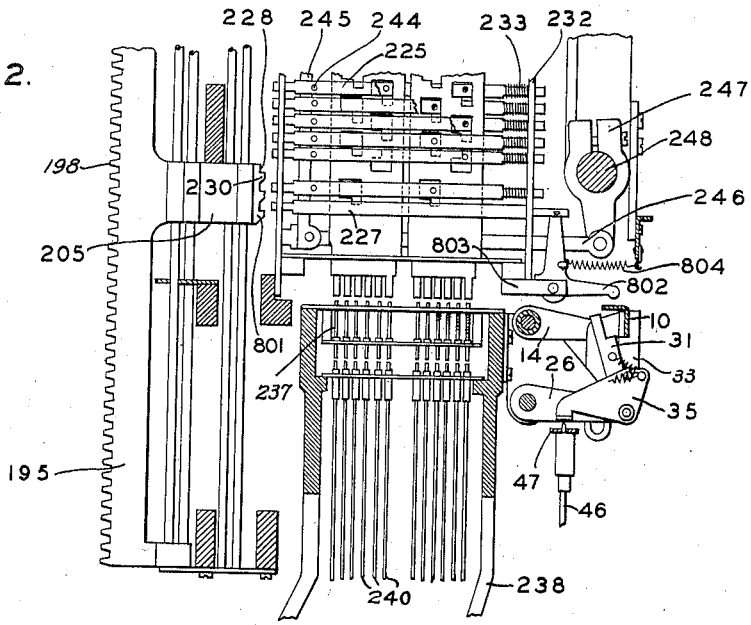
Fig. 2 is a section showing the arrangement of a type carrier and accumulator actuating rack, a naught stop, and the operating mechanism therefor.

The tabulating machine to which the invention is applied is completely disclosed in the above cited application and British patent and, therefore, a brief description of certain of its elements is sufficient for the purposes of the present disclosure. Referring to Fig. 1, perforated record cards placed in a card magazine 120 are passed by a picker mechanism 118 and feed rolls 108 to a sensing chamber wherein they are held by a card stop 122. During the time a card is held in the sensing chamber the perforated data therein is analyzed by sensing pins 138. The pins 138 that pass through a card are effective to elevate corresponding intermediate pins 146 which are locked up by locking slides 142. The pins 146 in turn serve to elevate translator wires 240, mounted in a removable translator frame 238. Each translator wire coacts, through an intermediate pin 237, with one of a plurality of differentially notched code bars 235 (see also Fig. 2) which are arranged in sets of six, there being one set of code bars for each column of the record card. The arrangement of the notches in each set of code bars is such that for any given combination of perforations in a column of a record only one of a plurality of type bar stops 225 that cooperate with a set of code bars is conditioned for leftward movement under control of its spring 233.

Figure 3:
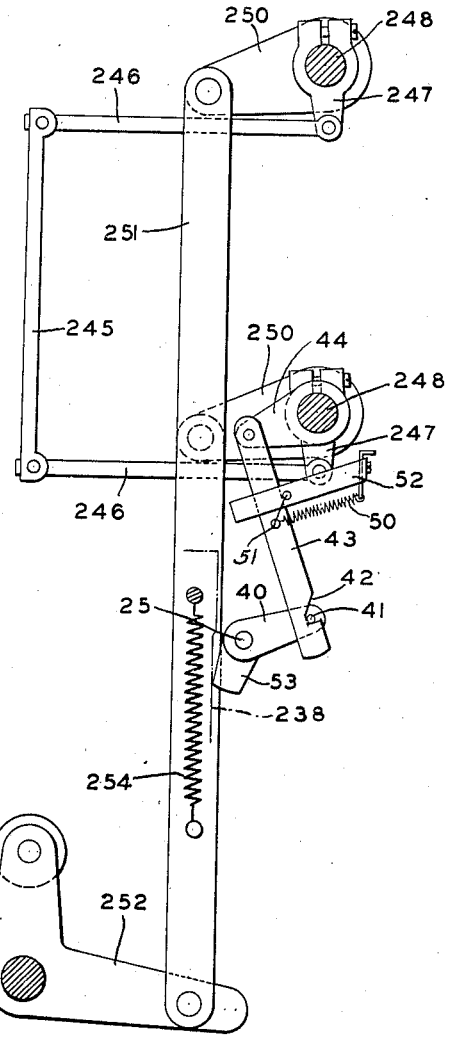
Fig. 3 is a detail of the type bar stop retracting mechanism of the tabulator of the cited application.

The time when such leftward movement occurs is determined by the type bar stop retract mechanism (see Fig. 3). This device comprises a plurality of vertical bars 245 that engage studs 244 (see also Fig. 2) in stop bars 225, and are connected by horizontal links 246 to arms 247 projecting downwardly from two rock shafts 248. Stop bars 225 are all forced to inactive position, as in Figs. 1 and 2, by counter-clockwise rotation of shafts 248, and are released at the proper time by clockwise rotation. Each of the shafts 248 has, on at least one end thereof, an arm 250, and said arms are connected by spring urged links 251 with a bell-crank 252. The upright arm of said bell-crank carries a follower roller cooperating with a cam 253 on a drive shaft 184 which is rotated once during each machine cycle by the main drive shaft 112 (see Fig. 1). Attention is called to the fact that while a card is sensed near the end of one cycle, the data thereon is not printed until near the middle of the next cycle. This results in the code bars 235 being held up until the sensing of the succeeding card causes the elevation of a new combination of code bars. Following this operation the retract bail 245 momentarily releases all the bars, permitting those not held up by intermediate pins 237 to restore to normal, after which the new selection becomes effective and the selected stop 225 is permitted to extend into the stopping position.

It will be noted that when stop bars 225 are released during each machine cycle, the stop bar retracting frame members 245 and 246 are urged leftwardly by the combined force exerted by a plurality of springs 233, i. e., by one spring in each set of code bars 235. Thus, these springs, in addition to the springs on links 251, exert a considerable force to restore shafts 248 to their extreme clockwise position. It is this cyclically effective force which is utilized, as hereinafter described, to operate naught block mechanism in the present embodiment.

After one of the stop bars 225 is set in its leftward position a type bar 195, having a plurality of type 197 at its upper end, is moved upwardly by suitable means until a face 228 or shoulder 230 formed in a guide 205 attached thereto is arrested by the extended stop bar. When this occurs, the type corresponding to the perforation pattern sensed in the record is in printing position and, at the proper time in the cycle, is forced against the report sheet held on platen 203 by a printing hammer 620. After printing is effected, type bar 195 is restored by its operating mechanism and, in the event the data sensed is numerical and is to be accumulated, one or both of the accumulators will have been engaged by their operating mechanisms with an accumulator actuating rack 198 formed on the type bar, and the amount is thereby entered. Inasmuch as the printing and accumulating mechanisms as such do not form a part of the present invention, they need not be considered further herein. However, in order to better understand the invention, it is well to note that near the end of each cycle at approximately 345° the retract bail 144 associated with the upper pin box (Fig. 1) is rocked. This movement pushes locking slides 142 to the left, thereby releasing all pins 146, with their associated Bowden wires 46 and 240, that are not held elevated by pins 138, which at that time in the cycle are raised to their extreme by the lower pin box.

In order to prevent printing and/or accumulation of data in accordance with the perforations in a record, the lowermost stop 227 (Figs. 1 and 2) in each vertical column of type bar stops is arranged to block the associated type bars 195 against rising so as to render them, and any accumulators actuated by them, inactive in that cycle. When in any column this stop is projected it engages a tooth 801 on a guide piece 205, fixed to the type bar, and prevents the bar from rising. This particular stop is not provided with any spring 233 nor pin 244, but is controlled entirely by a bell-crank 802, a series of such bell-cranks being pivoted in comb pivot blocks 803 secured to the frame of the machine. Each stop 227 projects through a frame bar 232 and is pivoted to the associated bell-crank 802, being normally held in its retracted position by a spring 804 attached to the bell-crank.

With the above described mechanism in mind, let us now consider a report sheet typical of many that are required to be prepared by such machines. Figs. 9 and 9A, taken together, represent a premium notice (Fig. 9), with a return stub (Fig. 9A) attached thereto, similar to those sent periodically by insurance companies to their policy holders. Notices of this type may be made from cards specially prepared for that purpose, but more frequently are prepared from cards that are also used in compiling various types of statistical information. In the present instance line A on the premium notice and return stub are printed simultaneously from a card containing information relating primarily to the policy holder, whereas line B is printed from a card containing information relating primarily to the policy itself. In neither case is all the information on the card desired to appear on the premium notice or return stub. From inspection it is apparent that most of the information appearing on the return stub is Y-wired from certain of the fields of the cards from which data on the premium notice is printed. However, it is also apparent that the spacing and location of data such as agency and policy number has been altered. Thus, if there were no means to prevent printing in portions of line A of the return stub the resulting printing would be meaningless. However, inasmuch as a substantial portion of the policy holder's name, in conjunction wtih the policy number, is sufficient to identify the policy holder accurately when the detached return stub is received with his premium payment, all but the first nine characters on line A of the return stub may be blocked out under control of a special hole in the card. Furthermore, in the application considered, the information called for under the last two headings of line B of the premium notice is not punched in the card but is required to be entered manually, if at all. In order to prevent the entry of erroneous data from other sections of the card under these headings, these columns must be blocked out when line B is printed.

Figure 7:
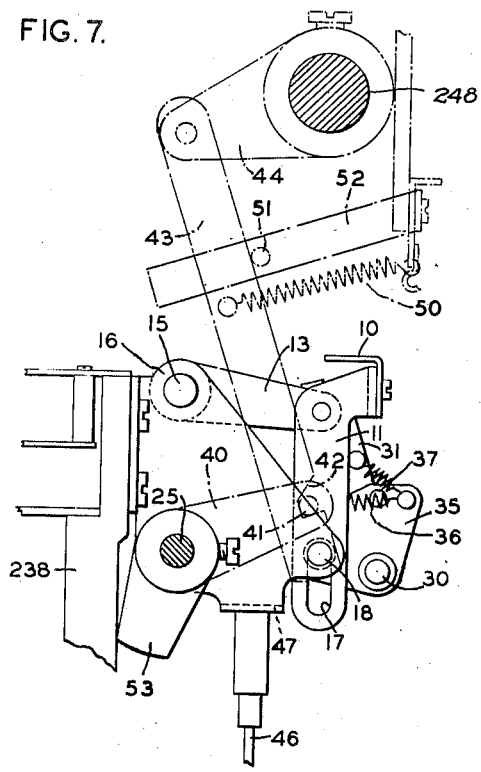
Fig. 7 is an enlarged section taken along the line 7—7 of Fig. 4 and includes an operating shaft of the type bar stop retract mechanism.
Figure 6:
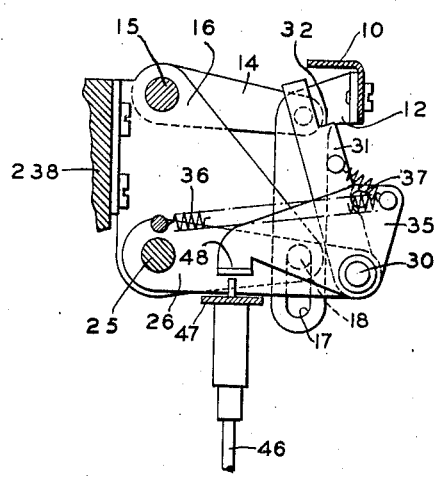
Fig. 6 is an enlarged section taken along the line 6—6 of Fig. 4.
Figure 4:
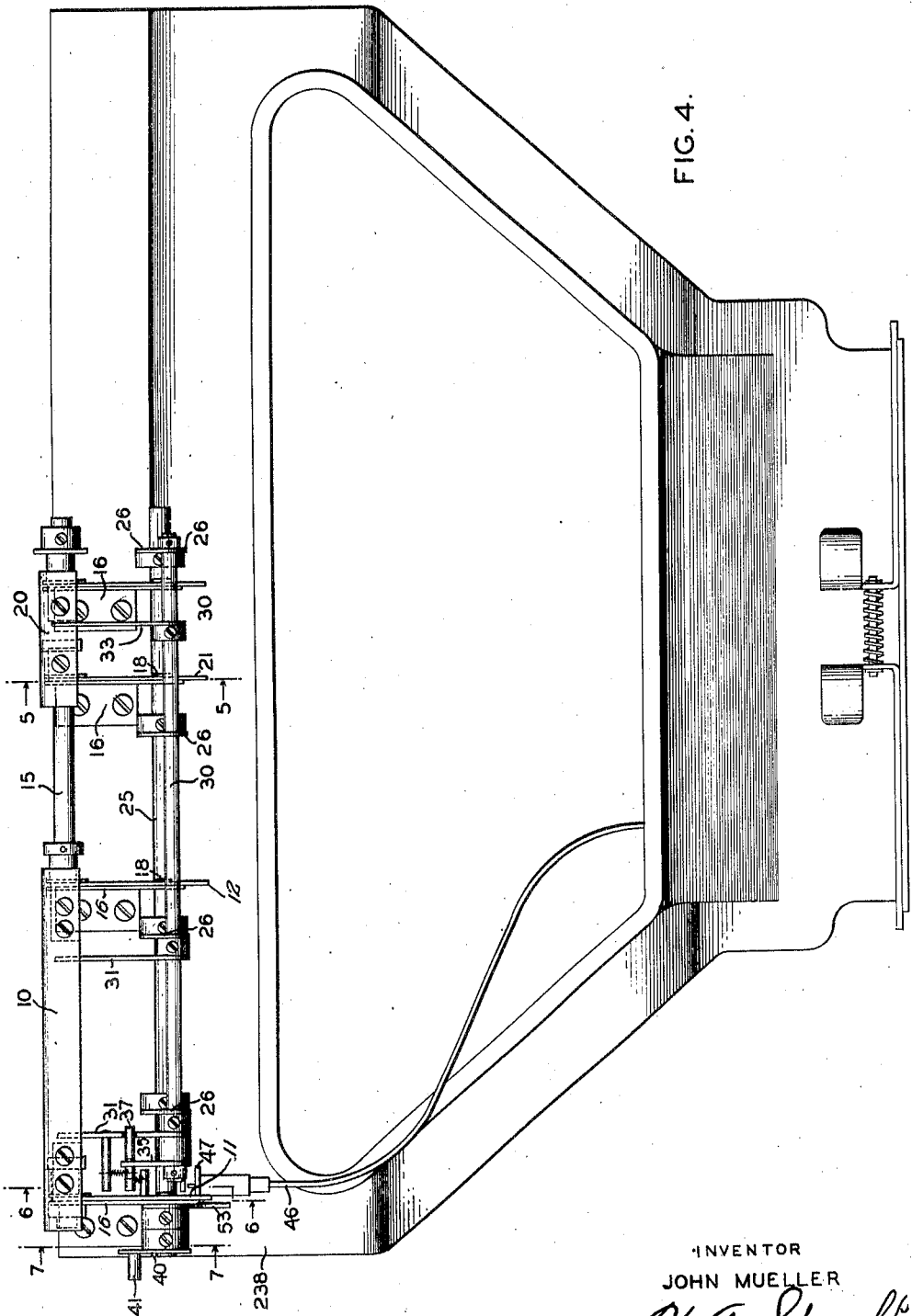
Fig. 4 is a rear view of a removable translator equipped with the invention.

To attain these ends the naught stops 227 in the columns corresponding to the last twenty-nine spaces of line A of the return stub must be operated when line A is printed, and the naught stops 227 in the columns corresponding to the last eleven spaces of line B of the premium notice must be operated when line B is printed. For this purpose, a naught block 10 (see Figs. 4, 6, and 7), formed from angle stock and of sufficient length to underlie the horizontal arms of bell-cranks 802 in the first mentioned twenty-nine columns, is fixed to guide links 11 and 12 which are pivotally connected to arms 13 and 14, respectively, pivotally mounted on a transverse shaft 15 supported by brackets 16 fixed to the rear of the removable translator 238. The lower ends of guide links 11 and 12 are provided with slots 17 that are guided by studs 18 fixed in brackets 16.

Figure 5:
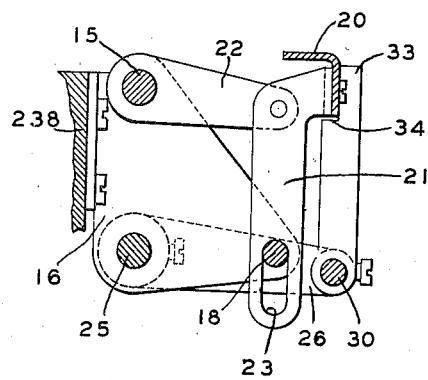
Fig. 5 is an enlarged section taken along the line 5—5 of Fig. 4.

In a similar manner, a naught block 20 (see Figs. 4 and 5), of sufficient length to underlie the horizontal arms of bell-cranks 802 in the second mentioned eleven columns, is fixed to guide links 21 which are pivotally connected to arms 22 pivotally mounted on shaft 15. The lower ends of guide links 21 are provided with slots 23 guided by studs 18 fixed in the associated brackets 16.

Also mounted in brackets 16 is a transverse rock shaft 25 (Figs. 4, 5, 6, and 7) having fixed thereto a plurality of horizontal arms 26, that support a second rock shaft 30. Fixed to the shaft 30 are a pair of substantially upright arms 31 (Fig. 6) each having a shoulder 32 adapted to coact with the vertical leg of naught block 10, and an upright arm 33 (Fig. 5) having a shoulder 34 adapted to coact with the vertical leg of naught block 20. Pivotally mounted on rock shaft 30 is a triangular member 35 which is urged counter-clockwise by a spring 36, anchored to the extreme left-hand bracket 16, and which is provided with a stud 37 that abuts the left-hand arm 31 whereby the entire assembly including shaft 30, arms 31, and arm 33 is normally urged counter-clockwise by spring 36 so that shoulder 34 of arm 33 is moved under naught block 20.

Figure 8:
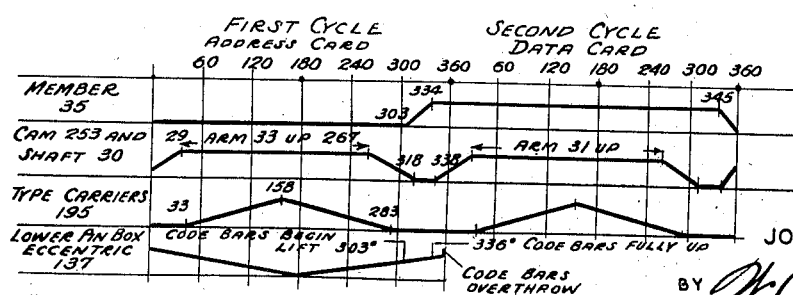
Fig. 8 is a timing diagram.

If now translator 238 is placed in the machine, naught block 10 underlies bell-cranks 802 (see Fig. 2) of the twenty-nine columns corresponding to the blank spaces of line A of the return stub, and naught block 20 underlies bell-cranks 802 (see Fig. 1) of the eleven columns corresponding to the blank spaces of line B of the premium notice. Furthermore, a stud 41 (see Figs. 3 and 4) in an arm 40, fixed to end of rock shaft 25, engages a notch 42 in a link 43 that is pivotally connected to an arm 44 that is fixed to the lower shaft 248 of the type bar stop retract mechanism. With this arrangement, if card control be momentarily disregarded, the rocking of shaft 248 during each cycle under control of cam 253 is effective to rock shaft 25 counter-clockwise to raise shaft 30 and, through arm 33 which is in the position of Fig. 5, to elevate naught block 20 from about 29° to about 267° of the address card cycle (Fig. 8). This movement, through bell-cranks 802 would serve to operate naught stops 227 in the corresponding columns to prevent printing and/or accumulating from the address card. However, each card containing the policy holder's name and address is provided with a control hole in any convenient position arranged to actuate the core of a Bowden wire 46 which is anchored at its upper end to a turned over ear 47 on the extreme left-hand bracket 16, and underlies a turned over ear 48 on triangular member 35. Thus, as address cards are sensed in alternate cycles, translator wire 46, under control of the special perforation, starts to rock member 35 clockwise at about 303° of that cycle (Fig. 8) against the tension of spring 36. Member 35 is fully rocked at about 334° and remains rocked until about 345° of the next cycle. This movement, through a comparatively heavy spring 37 between member 35 and the left-hand arm 31, is effective to rock shaft 30 clockwise. Due to the fact that cam 253 does not rock the shaft 30 and members 35 down to the position of Fig. 6 until about 318° of the address card cycle, there is a short period during which the arm 33 is held by friction under the naught block 20, and the spring 37 is stretched. When, however, 318° is reached, the arm 33 is fully down and is free to move and at 334° the arm 31 is rocked under naught block 10 and the arm 33 is rocked free of naught block 20. For the remainder of the address card cycle, and for 345° of the data card cycle, the arm 31 is in position to elevate naught block 10. At 338° of the address card cycle the cam 253 permits shaft 25 to rock counter-clockwise under the influence of springs 233 and 254, thus raising arm 31 and its associated naught block 10 until it is fully raised at 29° of the data card cycle. At 267° of this cycle cam 253 starts to rock shaft 25 clockwise and at 318° of this cycle it is fully rocked and the naught block is fully down. Arm 31, however, remains under block 10 until 345° of this cycle, at which time the pin holding wire 46 elevated is unlocked by the retract bail 144, as described above. Thus at 345° of the data card cycle the member 35 is free to rock counter-clockwise, due to the lowering of Bowden wire 46, and arm 31 is rocked under the influence of spring 36 out from under naught block 10 and arm 33 is rocked into effective position with respect to naught block 20.

By means of this arrangement, a naught block which is adapted to coact with a plurality of naught stops substantially in excess of ten is conditioned for operation under control of a special perforation in a record card. The motive power for operating the naught blocks is derived from a plurality of springs 233 and 254, instead of, as in the past, by the action of one wire in the translator forced upward by a positive cyclically operated means. In this manner, proper operation of a plurality of naught stops, substantially in excess of that heretofore practicable, is effected under control of a perforation in a record without danger of damage to the translator.

A spring 50 and stud 51 (Figs. 3 and 7) in a bracket 52 fixed to the frame of the machine serve to hold link 43 in position to permit proper reengagement of notch 42 and stud 41 when a translator has been removed. In addition, an adjustable stop 53, fixed to shaft 25, is arranged to bear against the side of the translator frame 238 to retain the elements fixed to shaft 25 in their proper positions when the translator is removed.

Any suitable paper feeding mechanism may be employed to advance report sheets of the type illustrated from line A to B, and then from line B to line A of the following sheet. Inasmuch as this mechanism does not form a part of the present invention, it is not considered herein. However, a device particularly adapted for this work is disclosed in the application of John Mueller, S. N. 323,137, filed March 9, 1940, now Patent 2,288,828 issued July 7, 1942.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a tabulating machine having record sensing means the combination of a plurality of sets of type carriers settable under control of said record sensing means, blocking means individual to each of said sets of type carriers and arranged when actuated to prevent the operation of the associated type carriers, each of said blocking means comprising a naught stop for each type carrier operable to prevent movement thereof and a naught block to operate said naught stops, cyclically operative means for actuating said blocking means, interposer means individual to each of said naught blocks for transmitting movement from said cyclically operative means to the associated naught block, said interposer means being offset relative to each other whereby either may be rendered effective alternatively to transmit such movement, impositive means to render one of said interposer means effective and the other of said interposer means ineffective, and means operated by said record sensing means when a special perforation in a record is sensed to reverse the control of said impositive means.

2. In a tabulating machine having record sensing means the combination of a plurality of accumulators, a set of actuating racks individual to each accumulator and operable under control of the record sensing means for inserting amounts therein, blocking means individual to each of said sets of actuating racks and arranged when actuated to prevent the operation of the associated actuating racks, each of said blocking means comprising a naught stop for each actuating rack operable to prevent movement thereof and a naught block to operate said naught stops, cyclically operative means for actuating said blocking means, interposer means individual to each of said naught blocks for transmitting movement from said cyclically operative means to the associated naught block, said interposer means being offset relative to each other whereby either may be rendered effective alternatively to transmit such movement, impositive means to render one of said interposer means effective and the other interposer means ineffective, and means operated by said record sensing means when a special perforation in a record is sensed to reverse the control of said impositive means.

3. In a tabulating machine having record sensing means, the combination of a plurality of sets of differential members settable under control of said record sensing means, blocking means individual to each of said sets of differential members and arranged when actuated to prevent the operation of the associated differential members, each of said blocking means comprising a naught stop for each differential member operable to prevent movement thereof and a naught block to operate said naught stops, cyclically operative means for actuating said blocking means, interposer means individual to each of said naught blocks for transmitting movement from said cyclically operative means to the associated naught block, said interposer means being offset relative to each other whereby either may be rendered effective to transmit such movement, impositive means to render one of said interposer means effective and the other of said interposer means ineffective, and means operated by said record sensing means when a special perforation in a record is sensed to reverse the control of said impositive means.

JOHN MUELLER.